(12) United States Patent
Fishman et al.

(10) Patent No.: US 7,598,632 B2
(45) Date of Patent: Oct. 6, 2009

(54) CURRENT FED INVERTER WITH PULSE REGULATOR FOR ELECTRIC INDUCTION HEATING, MELTING AND STIRRING

(75) Inventors: Oleg S. Fishman, Maple Glen, PA (US); John H. Mortimer, Little Egg Harbor Township, NJ (US); Mike Maochang Cao, Westampton, NJ (US)

(73) Assignee: Inductotherm Corp., Rancocas, NJ (US)

( * ) Notice: Subject to any disclaimer, the term of this patent is extended or adjusted under 35 U.S.C. 154(b) by 77 days.

(21) Appl. No.: 12/098,418

(22) Filed: Apr. 5, 2008

(65) Prior Publication Data

US 2008/0246336 A1 Oct. 9, 2008

Related U.S. Application Data

(60) Provisional application No. 61/025,466, filed on Feb. 1, 2008, provisional application No. 60/910,650, filed on Apr. 7, 2007.

(51) Int. Cl.
*H01H 9/54* (2006.01)

(52) U.S. Cl. ...................................................... 307/140
(58) Field of Classification Search .................. 307/140
See application file for complete search history.

(56) References Cited

U.S. PATENT DOCUMENTS

| 6,343,021 | B1 | 1/2002 | Williamson |
| 6,505,675 | B2 | 1/2003 | Komuro et al. |

*Primary Examiner*—Robert L. Deberadinis
(74) *Attorney, Agent, or Firm*—Philip O. Post

(57) ABSTRACT

A current fed inverter with duty cycle regulation of dc current to the input of the inverter is provided to increase the magnitude of inverter output power while operating a resonant load at resonant frequency. The regulator duty cycle period is synchronized to the period of the output current of the inverter so that there are two regulator periods for each single output current period of the inverter. Duty cycle regulation may be provided by a single pulse in the regulator period, or a series of pulses in the regulator period. Output power magnitude greater than that available at full duty cycle can be provided by operating the inverter at off resonance. Multiple current fed inverters may be connected to individual coil sections around a crucible and selectively interconnected for a heating or melting mode, or a stir mode.

20 Claims, 12 Drawing Sheets

CURRENT FED INVERTER WITH PULSE REGULATOR FOR ELECTRIC INDUCTION HEATING, MELTING AND STIRRING

CROSS REFERENCE TO RELATED APPLICATIONS

This application claims the benefit of U.S. Provisional Application No. 60/910,650, filed Apr. 7, 2007 and U.S. Provisional Application No. 61/025,466, filed Feb. 1, 2008, both of which are hereby incorporated by reference in their entireties.

FIELD OF THE INVENTION

The present invention relates to power supplies with current fed inverters and regulation of such inverters, and application of such power supplies in electric induction heating, melting and stirring applications.

BACKGROUND OF THE INVENTION

FIG. 1 illustrates a classical current fed inverter 116 connected to an RLC resonant load. The resonant load may be, for example, induction coil, $L_{coil}$, that is used with an industrial electric induction furnace or heating device, in series with resistance element, R, that represents a magnetically coupled work load (for example, metal in a furnace or a metal gear placed in the induction coil) when ac current flows through the induction coil, and tank (resonant) capacitor, $C_{tank}$, connected in parallel with the induction coil and resistance element. The typical inverter is illustrated as a H-bridge with switching devices, $S_1$ through $S_4$ supplying current sequentially through switch pairs $S_1$-$S_4$ and $S_2$-$S_3$ to the resonant load during alternate electrical half-cycles. Regulated dc current is fed to the inverter through smoothing inductor, or choke, $L_{choke}$, which current is supplied from a suitable source. In FIG. 1 a three-phase, full-wave, variable-voltage rectifier 112, formed from silicon controlled rectifiers, $SCR_1$ through $SCR_6$, or other types of phase-controlled electric switches, is used to supply the dc current. Input to the rectifier is from a suitable ac source, such as a 50 or 60 Hertz, three-phase utility supply (designated as lines A, B and C in the figure).

FIG. 2 graphically illustrates performance characteristics of the inverter shown in FIG. 1. Parameters are inverter output current magnitude, $I_{out(INV)}$, in amperes, as a function of frequency; inverter output power magnitude, $P_{out(INV)}$, in kilowatts, as a function of frequency; inverter output voltage magnitude, $V_{out(INV)}$, in volts, as a function of frequency; maximum dc current, $I_{max}$, in amperes; maximum inverter output power, $P_{max}$, in kilowatts; and maximum inverter output voltage, $V_{max}$, in volts.

Rated (maximum) operating condition is defined by the intersection of the curves identified by operating line $L_2$. Resonant operating condition is defined by the minimum values of inverter output voltage, current and power as defined by operating line $L_1$. The inverter output voltage across the resonant load can be expressed by the formula:

$$V_{inv} = \frac{V_{dc}}{0.9 \cdot \cos\varphi},$$

where $V_{inv}$ is the output voltage of the inverter, $V_{dc}$ is the supplied dc voltage, and $\varphi$ is the phase shift between inverter output current and voltage.

The output power of the inverter ($P_{inv}$) is proportional to the square of the inverter voltage:

$$P_{inv} \approx V_{inv}^2.$$

Consequently to increase power, the resonant load will operate off resonance, with increasing reduction in efficiency as the power level increases. To reduce inverter output power to a level lower than that at resonance, the dc output from the rectifier is reduced by phase control of the rectifier's switches.

It is one object of the present invention to provide power control of a current fed inverter while keeping the load at resonance, by means other than phase control of an input rectifier. Another object of the present invention is to minimize the size of reactive components used in the inverter.

Another object of the present invention is to provide uniform mixing of an electrically conductive material, such as a molten metal bath, placed within an induction furnace.

Another object of the present invention is to maximize the surface area of the molten bath that is exposed to ambient environment, particularly when that environment is substantially a vacuum, to promote outgassing by modulating the convex meniscus forming the surface area.

BRIEF SUMMARY OF THE INVENTION

In one aspect the present invention is an apparatus for, and method of, controlling the magnitude of output power of a current fed inverter by duty cycle regulation of dc current to the input of the inverter wherein the period of the regulator's duty cycle is synchronized to the period of the output current of the inverter so that there are two regulator periods for each single output current period of the inverter. Duty cycle regulation may be provided by a single pulse in the regulator period, or a series of pulses in the regulator period. Output power magnitude greater than that available at full (unity) duty cycle can be provided by operating the inverter at off resonant conditions.

The above and other aspects of the invention are set forth in this specification and the appended claims.

BRIEF DESCRIPTION OF THE DRAWINGS

The foregoing brief summary, as well as the following detailed description of the invention, is better understood when read in conjunction with the appended drawings. For the purpose of illustrating the invention, there is shown in the drawings exemplary forms of the invention that are presently preferred; however, the invention is not limited to the specific arrangements and instrumentalities disclosed in the following appended drawings.

DETAILED DESCRIPTION OF THE INVENTION

Figure 1:
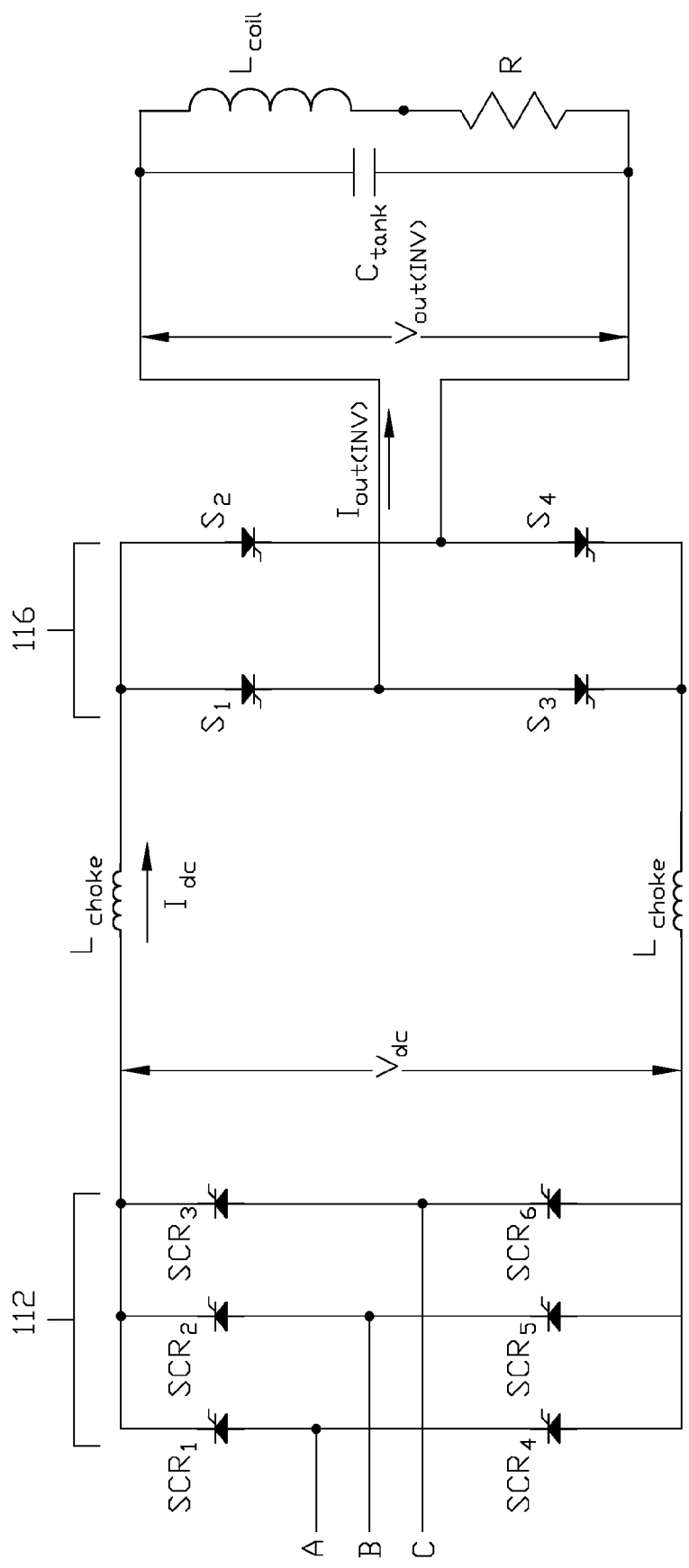
FIG. 1 is a simplified schematic diagram of a typical current fed power supply.
Figure 2:
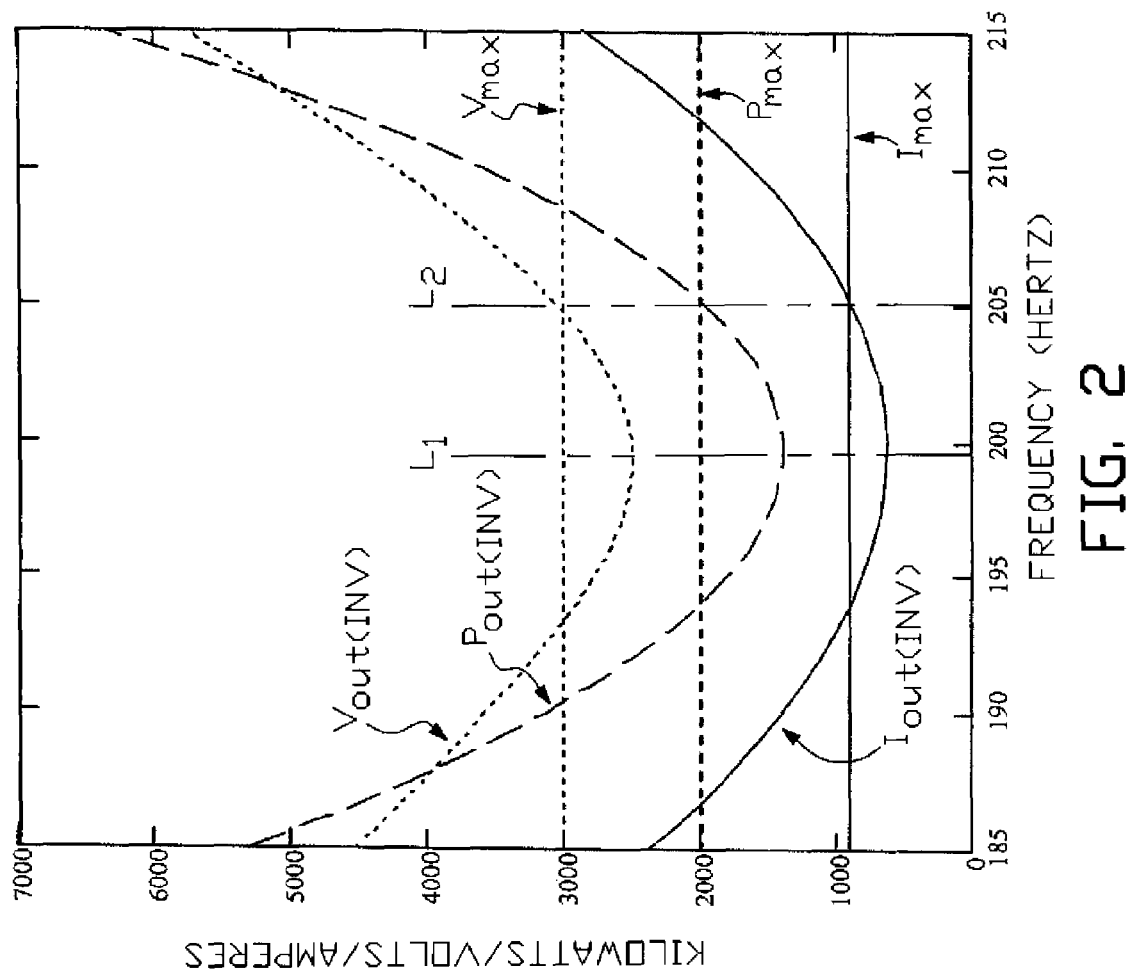
FIG. 2 is a graph of the typical operating parameters of the power supply shown in FIG. 1.
Figure 3:
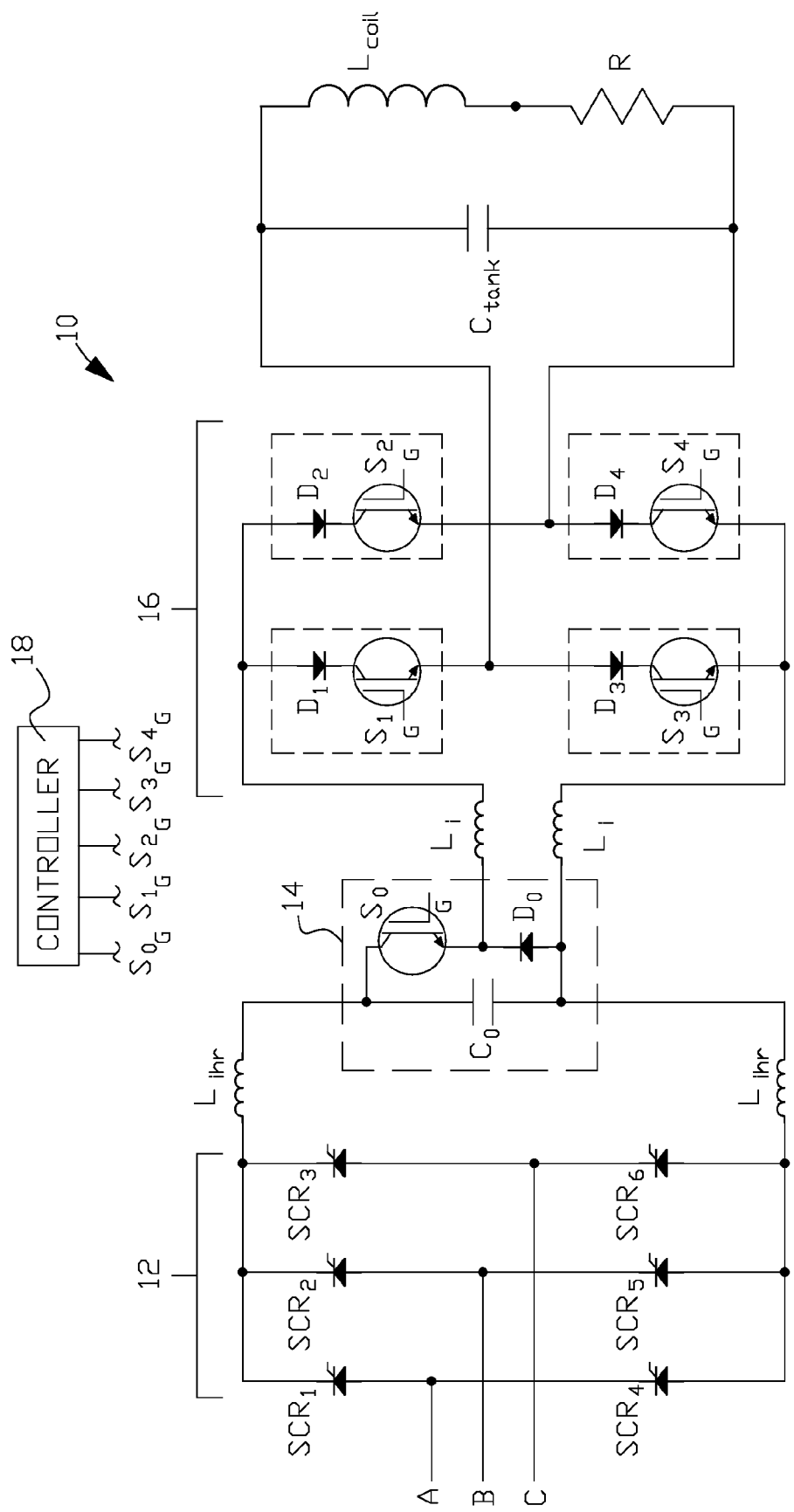
FIG. 3 is a simplified schematic diagram of one example of a power supply with a current fed inverter of the present invention connected to a resonant load.

One example of the power supply 10 of the present invention is illustrated in FIG. 3. The power supply comprises three active sections, namely rectifier 12, power regulator 14 and current inverter 16. Optional interharmonic reduction elements, illustrated in FIG. 3 as passive inductors (chokes), $L_{ihr}$, connect the dc output of the rectifier to the power regulator. Energy storage elements, illustrated in FIG. 1 as passive inductors (chokes), $L_i$, connect the output of the power regulator to the input of the inverter.

Input to three-phase rectifier 12 is from a suitable ac source, for example, 50 or 60 Hertz utility power (designated as lines A, B and C in the figure). Rectifier 12 comprises a full-wave phase-controlled rectifier comprising six switch devices, such as silicon controlled rectifiers $SCR_1$ through $SCR_6$ in this non-limiting example. In other examples of the invention the rectifier may be of a half-wave phase-controlled design, or other suitable type. As further explained below, the rectifier operates as a constant voltage rectifier except for soft start of the power supply to prevent initial overcharge of the regulator's energy storage device, which is represented by capacitive element, $C_0$, in FIG. 3.

Inverter 16 comprises four switch devices, which in this non-limiting example are configured as an H-bridge. Each switch device is symbolically illustrated as an insulated gate bipolar transistor (IGBT) in series with a diode, although other types of switch devices and bridge configurations may be used in other examples of the present invention. Generally in steady state operation, inverter switch pair $S_1$ and $S_4$ conduct for an electrical half cycle (that is, positive half cycle) and inverter switch pair $S_2$ and $S_3$ conduct for the following electrical half cycle (that is, negative half cycle), to deliver ac current to a resonant load circuit, which may comprise an electric induction furnace, or heating coil, diagrammatically represented by inductive element $L_{coil}$, in series with resistive element R generally representing the impedance of the magnetically coupled load being melted or heated; and tank (resonant) capacitor $C_{tank}$ connected in parallel with the series combination of $L_{coil}$ and R to form an "RLC" resonant load. As the resonant load impedance changes, the output frequency of inverter 16 is adjusted by controller 18 to keep the inverter operating at or near resonance to maximize power transfer to the resonant load circuit by gating control of the inverter's switch devices.

Controller 18 controls the duration and frequencies of the inverter's switch devices and regulator switch device $S_0$, which is also symbolically illustrated as an IGBT, but may be any other suitable type of switch device. In the power supply of the present invention, regulator 14 is synchronized with the output frequency of the inverter by controller 18 so that the period of regulator 14 (regulator period) is held at one half the period of the ac output frequency of inverter 16. Typically inverter 16 will operate at a frequency approximately in the range of 100 Hertz to 1,000 Hertz for an application related to use of an industrial electric induction furnace or induction heating coil arrangements for heating electrically conductive materials. Consequently regulator 14 will operate with a period approximately in the range of 5 ms (1/100 Hertz) to 0.5 ms (1/1,000 Hertz).

While regulator 14 operates at one half the period of inverter 16, regulator 14 operates with a variable duty cycle within the regulator period in steady state operation. For example regulator switch $S_0$ may be conducting for only 80 percent of the regulator period (0.8 duty cycle), during which time, regulator energy storage device, which in this non-limiting example is represented by energy storing inductor (choke), $L_i$, charges from capacitive element $C_0$, which is continuously charged from rectified utility power. During the regulator period when $S_0$ does not conduct (switch device $S_0$ open), current is supplied to the inverter from energy stored in chokes $L_i$. The magnitude of the output power is controlled by the duty cycle of switch $S_0$; that is, the ratio of the time period that switch $S_0$ is in the on, or conducting state, to the time period that the switch is in the off or non-conducting state. As the duty cycle decreases, the ac current ripple component of the dc inverter input current supplied from chokes $L_i$ increases; consequently, if a single regulator pulse is used in every regulator period, choke $L_1$ must be designed as a high storage capacity choke with a large value of electrical inductance, and consequently, a large physical size. In order to minimize the size of the choke, at lower duty cycles, multiple on/off regulator pulses are provided in the regulator period in some examples of the present invention.

The magnitude of current flowing through regulator switch $S_0$ at low duty cycles is significantly less than the current flowing through regulator switch $S_0$ at high duty cycles. Consequently switching losses in switch $S_0$ will be lower at low duty cycles. In the present invention, the lower switching losses at low duty cycles is taken advantage of by providing current to the inverter in multiple on/off pulses within the regulated period of the regulator to provide the same magnitude of current ripple as the current ripple that would be supplied with a single low duty cycle pulse. This arrangement allows significant reduction in the required electrical rating of choke $L_i$ since more frequent pulses at low duty cycle require significantly less energy storage capacity in choke $L_i$ since that stored energy will be the source of current to the inverter when switch device $S_0$ is not conducting for shorter intervals. A suitable, but non-limiting, control algorithm is as follows:

$$N = \frac{W_{max} - W_{cond}}{W_{sw}}$$

where N equals the number of allowed regulator pulses in a regulator period;

$W_{max}$ equals the maximum allowed power dissipation specified for a selected regulator switch $S_0$;

$W_{cond}$ equals the conduction losses specified for a selected regulator switch $S_0$; and $W_{sw}$ equals the calculated switching losses with a single regulator on/off duty cycle pulse in a regulator period.

Therefore, for example, for a desired inverter output power magnitude at resonance requiring a single regulator on/off duty cycle of 0.3, $W_{sw}$ is calculated for switch $S_0$ current for 0.3 duty cycle, and maximum N at 0.3 duty cycle is calculated from the above equation using specified $W_{max}$ and $W_{cond}$ for the selected switch $S_0$.

Figure 6A:
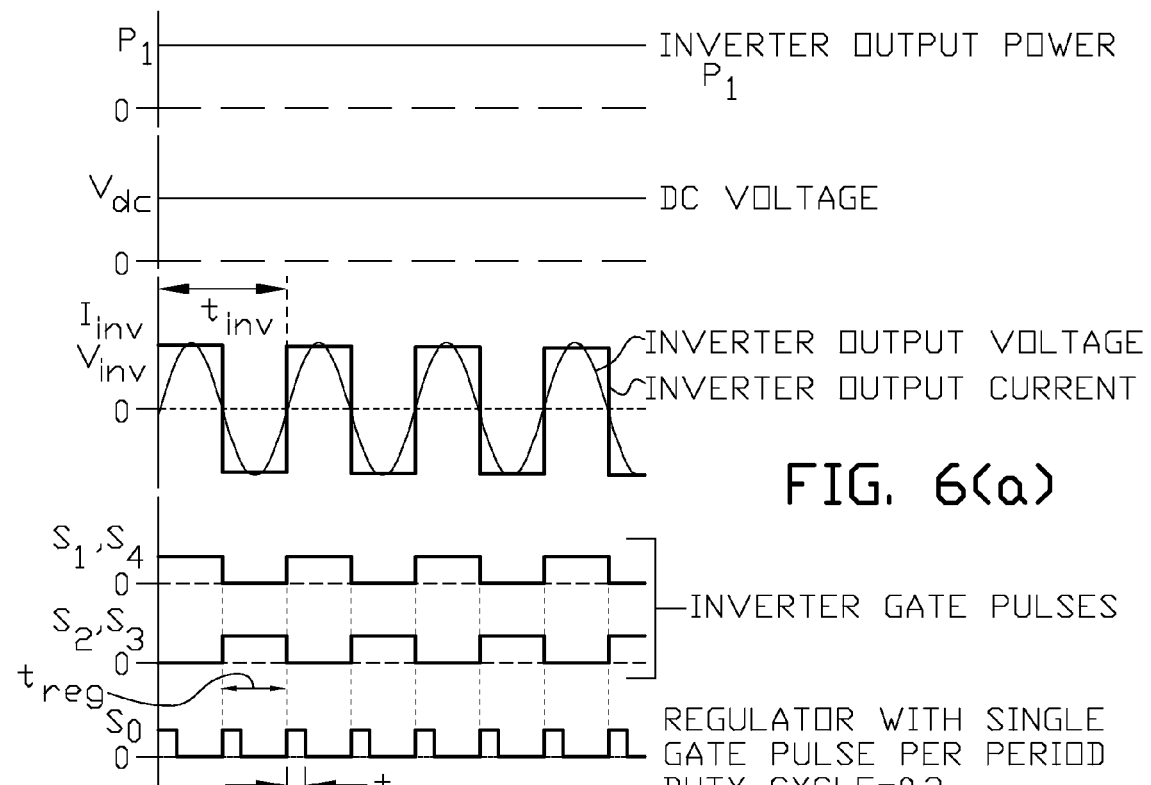
FIG. 6(a) and FIG. 6(b) graphically illustrate single pulse and multi-pulse regulator performance for one example of the current fed inverter power supplies of the present invention.
Figure 6B:
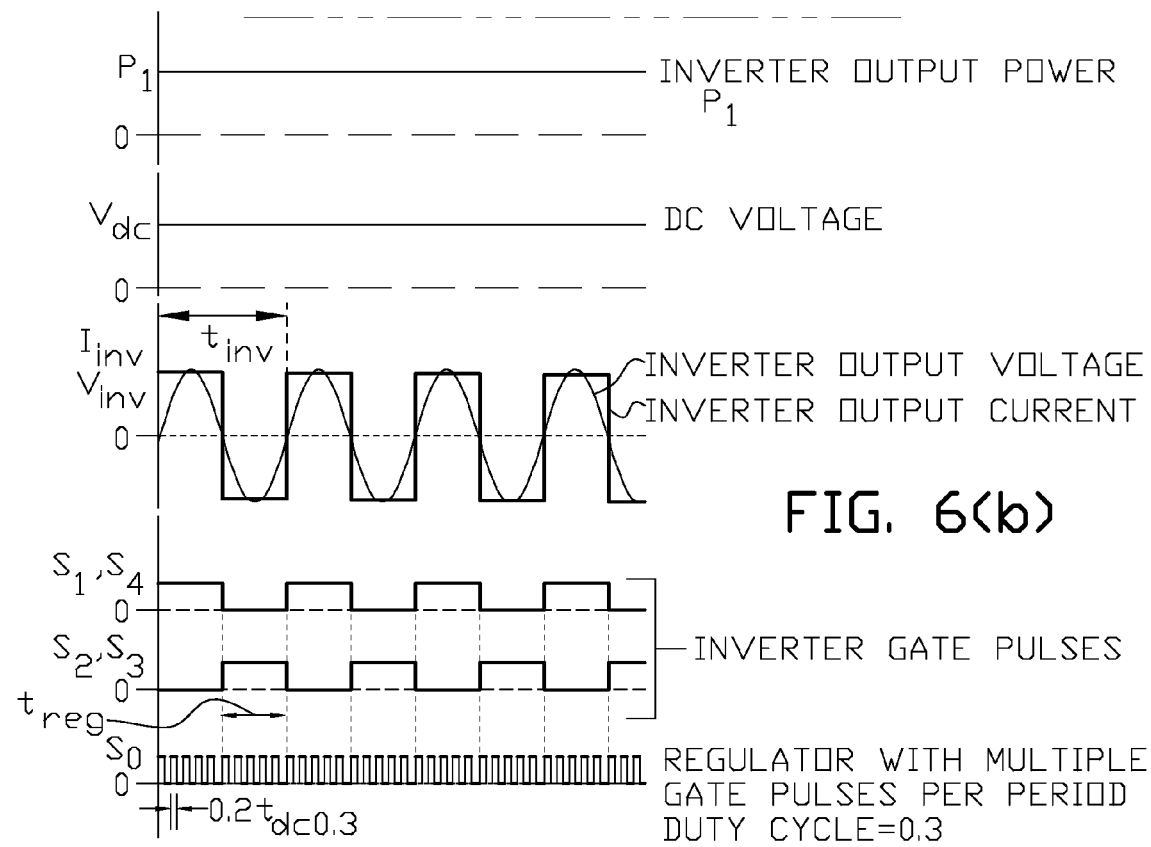

By way of illustration and not limitation, FIG. 6(a) and FIG. 6(b) graphically illustrate single pulse versus multi-pulse regulation, for example, at 0.3 duty cycle. In both figures, $t_{inv}$ represents the period of inverter's output frequency, and $t_{reg}$ represents the period of the regulator, which is one half the period of the inverter's output frequency. In FIG. 6(a) single regulator pulse in each regulator period, $t_{reg}$, is not preferred, as explained above; multiple regulator pulses, as illustrated by regulator pulses in FIG. 6(b) are preferred. The number of pulses in a regulator period will vary depending upon the range of required inverter current and switch losses of a particular regulator switch used in an application. Five regular pulses are used in FIG. 6(b) for clarity. Generally the number of pulses per regulator period may vary from two to hundreds, in a duty cycle range from less than unity to greater than zero, respectively.

Figure 7A:
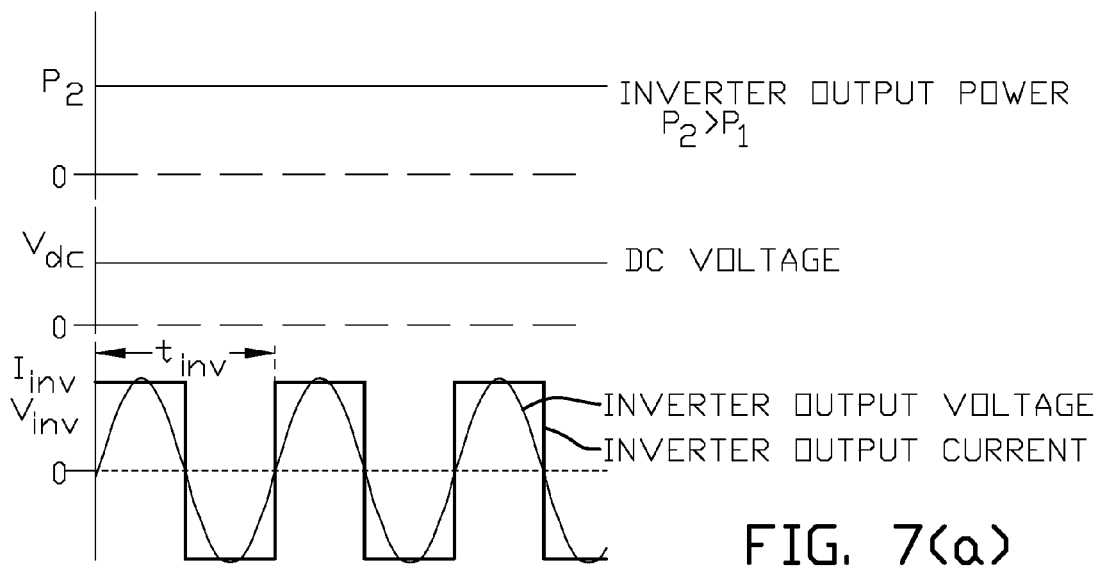
FIG. 7(a) and FIG. 7(b) graphically illustrate parameters at unity duty cycle/resonance and unity duty cycle/off resonance of one example of the current fed inverters of the present invention.
Figure 7A:
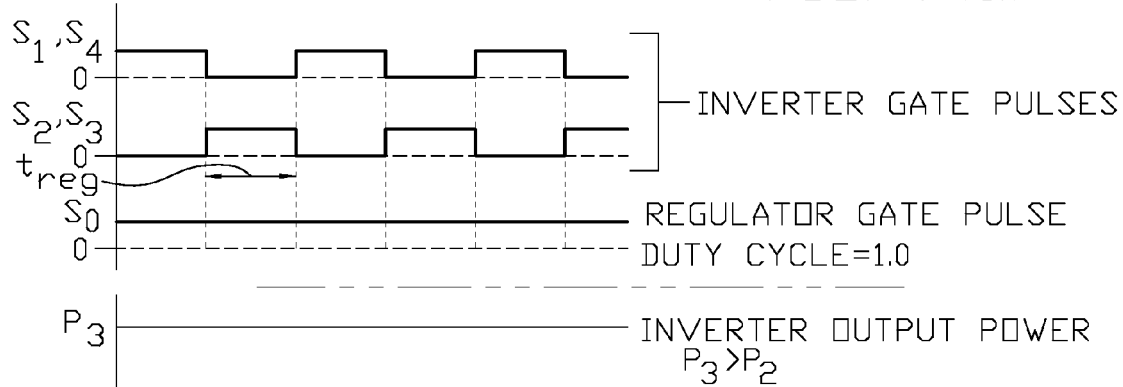
Figure 7B:
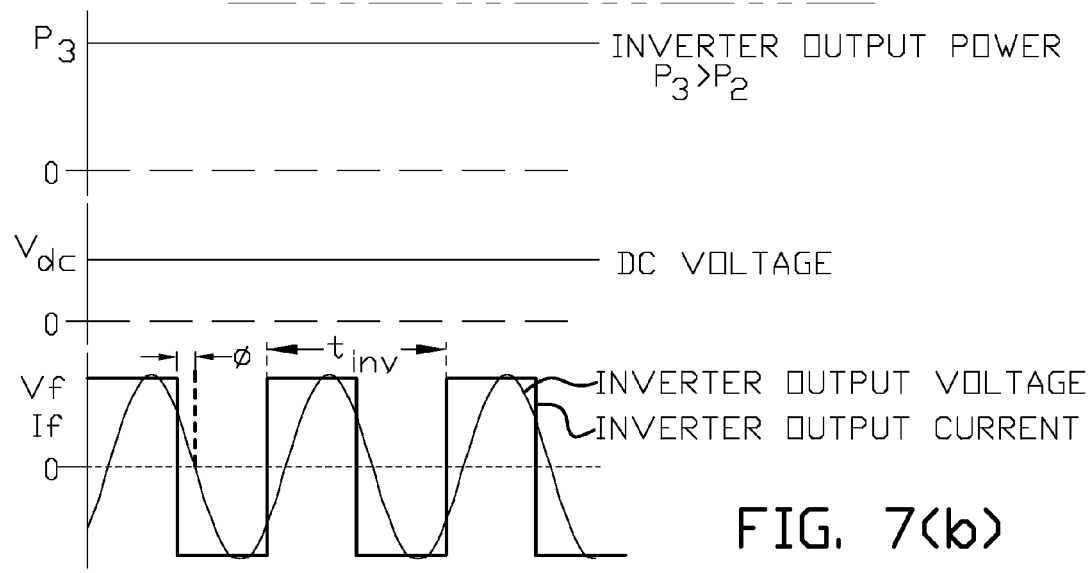
Figure 7B:
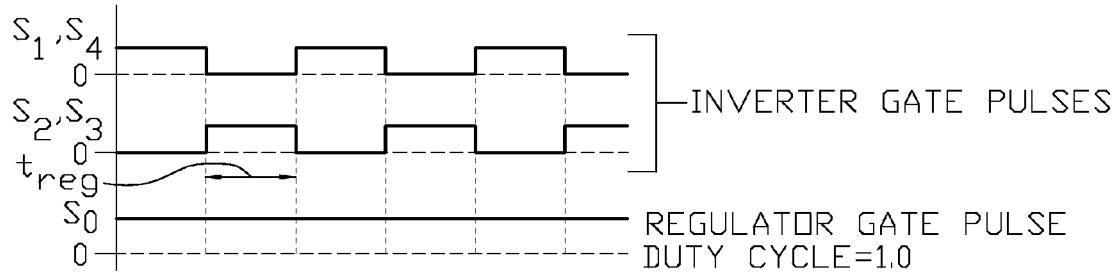

If more inverter output power is required than that with a duty cycle of 1.0 at resonance, additional output power can be provided by increasing the output frequency of the inverter, which will supply more power but not at resonance. FIG. 7(a) and FIG. 7(b) graphically illustrate inverter parameters at unity duty cycle/resonance and unity duty cycle/off resonance, respectively, when greater inverter output power can be provided. FIG. 7(a) illustrates inverter resonant output power magnitude of $P_2$, which is greater than power magnitude $P_1$, with duty cycle equal to 1.0 at resonance. FIG. 7(b) illustrates inverter off-resonant output power magnitude of $P_3$, which is greater than power magnitude $P_2$, with duty cycle equal to 1.0 and a phase shift (ø) between the inverter's output current and voltage.

For a non-vacuum electric induction furnace application, components of a power supply with the current fed inverter of the present invention would generally be fully rated for maximum power output in the off-resonance power range; for a vacuum electric induction furnace application, components of a power supply with the current fed inverter of the present invention would generally be fully rated for maximum power at resonant, unity duty cycle operation.

Figure 4:
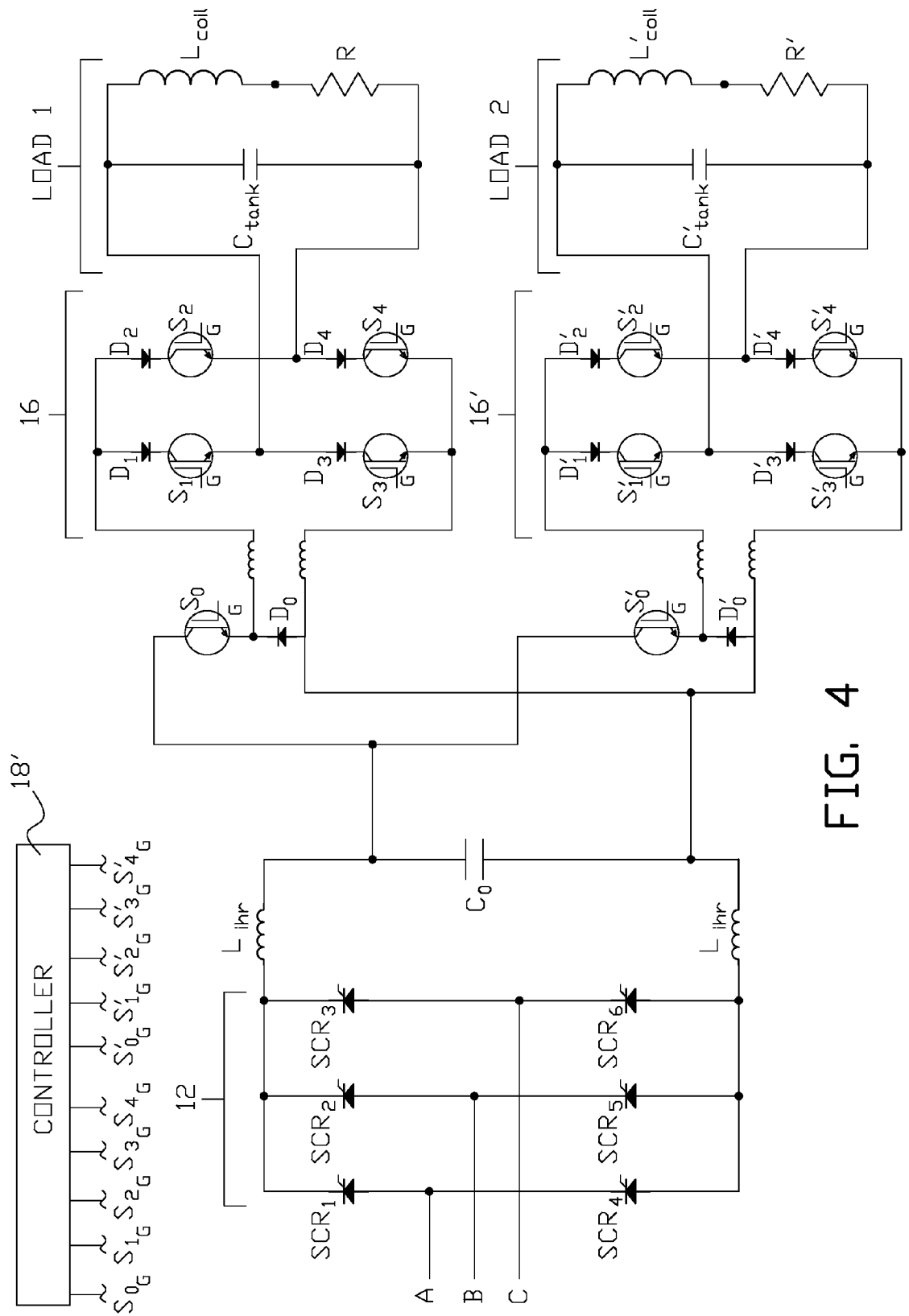
FIG. 4 is a simplified schematic diagram of another example of a power supply of the present invention wherein multiple current fed inverters, each individually regulated, are each connected to a different resonant load and a single rectifier.

In another example of a power supply with current fed inverters of the present invention, as illustrated in FIG. 4, multiple inverters 16 and 16', each with a dedicated regulator switch ($S_0$ and $S'_0$) and diode ($D_0$ and $D'_0$), can be powered from single rectifier 12 and energy storage device, capacitor $C_0$, that is connected to the output of the rectifier. In this arrangement, controlled, apportioned distribution of power among multiple resonant loads LOAD 1 and LOAD 2 can be accomplished by individual pulse regulation of inverters 16 and 16' as described above, subject to a maximum total power output established by the rating of rectifier 12. While two inverter/load circuits are shown in FIG. 4, any number of inverter/load circuits can be used.

Figure 5:
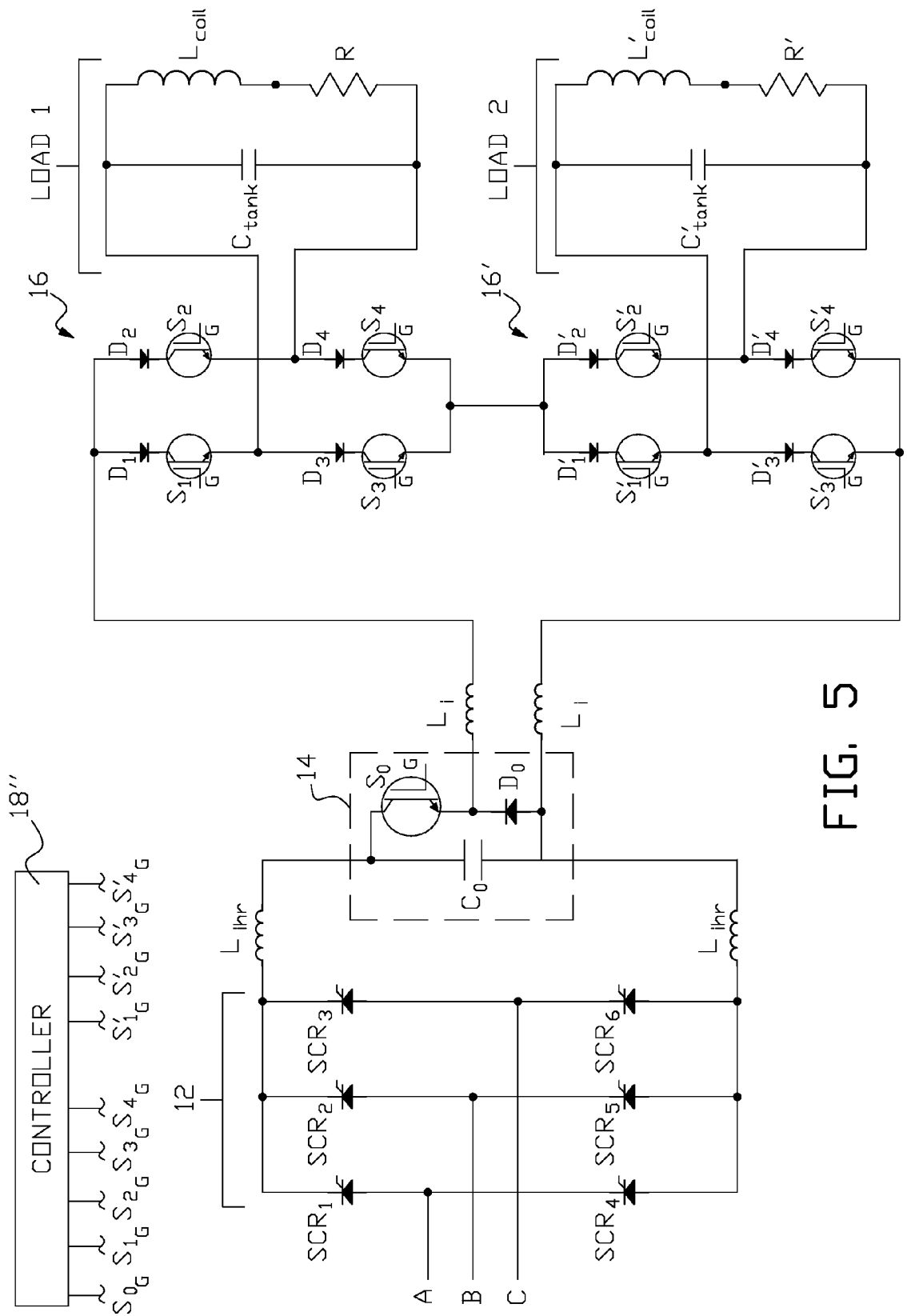
FIG. 5 is a simplified schematic diagram of another example of a power supply of the present invention wherein multiple current fed inverters, regulated by a common regulator, are each connected to a different resonant load and a single rectifier.

In another example of a power supply with current fed inverters of the present invention, as illustrated in FIG. 5, multiple inverters 16 and 16', each serving dedicated resonant loads LOAD 1 and LOAD 2, respectively, can be selectively powered from single regulator 14, which is connected to the output of a rectifier operating at full-wave output as described above. With switches $S_1$, $S_3$, $S'_1$ and $S'_4$ conducting, and switches $S_2$, $S_4$, $S'_2$ and $S'_3$ not conducting, current is supplied to LOAD 2, but not applied to LOAD 1, for example, for an electrical half-cycle; while in the next electrical half-cycle, switches $S_2$, $S_4$, $S'_2$ and $S'_3$ are conducting, and switches $S_1$, $S_3$, $S'_1$ and $S'_4$ are not conducting to continue supply of current to LOAD 2.

Figure 8:
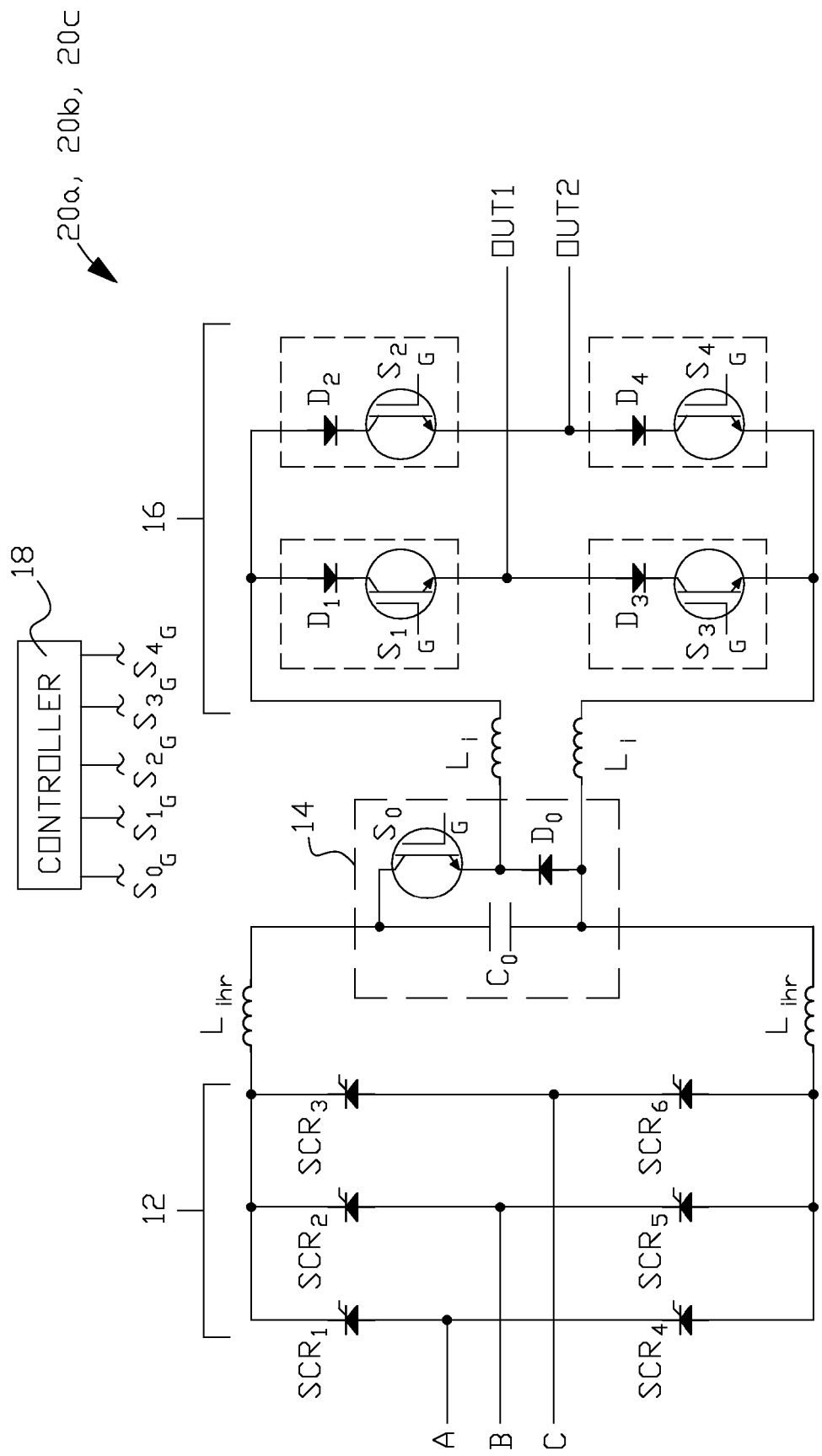
FIG. 8 is a simplified schematic diagram of another example of a power supply with a current fed inverter of the present invention.
Figure 9A:
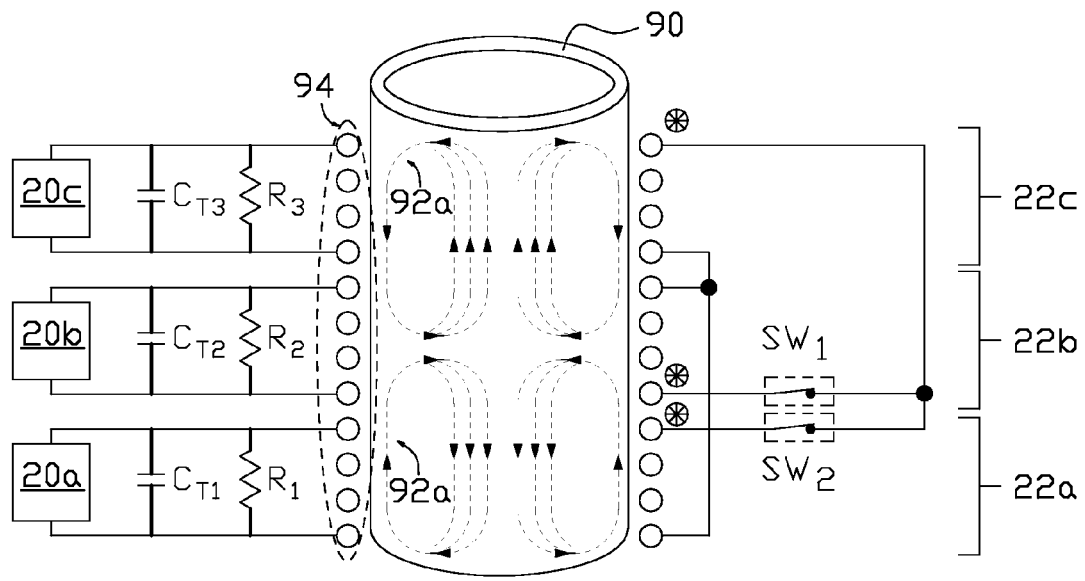
FIG. 9(a) and FIG. 9(b) are diagrammatic illustrations of an electric induction heating, melting and stirring arrangement using power supplies shown in FIG. 8.

While the switching schemes are generally described above for inductive heating and melting, in other examples of the invention, the switching schemes may be used to affect induced stirring patterns when used as an inverter in an induction furnace application. Such an application is illustrated in the non-limiting example shown in FIG. 8, FIG. 9(a) and FIG. 9(b). FIG. 8 is one example of ac power supplies 20a, 20b and 20c that are used to supply power to each one of three induction coils, namely lower coil 22a, middle coil 22b and upper coil 22c, which surround crucible 90. Tank capacitors $C_{T1}$, $C_{T2}$ and $C_{T3}$ are provided at the output of each power supply. Each capacitor may have a different capacitance value. Resistive elements $R_1$, $R_2$ and $R_3$ represent the resistance of a magnetically coupled load being heated, melted or stirred in crucible 90 that is surrounded by each coil section. Switches $SW_1$ and $SW_2$ are used to balance coil currents when the switches are closed in the melt mode as shown in FIG. 9(a). With both $SW_1$ and $SW_2$ closed the established orientation of magnetic flux is as illustrated by typical flux line 94. One advantage of this arrangement is that each switch may have a continuous current rating of approximately 10 percent of the full current (power) rating of the crucible since the impedance of the induction coil sections of the furnace are similar in value, with a typical deviation between coils of less than 10 percent. Switches $SW_1$ and $SW_2$ may be of a mechanical or electrical type. Switches $SW_1$ and $SW_2$ may be combined into one suitably arranged switching device. A typical, but non-limiting, electronic switch is illustrated in FIG. 10(c), as a diode bridge SCR switch. The current between coil sections is relatively low, which favors the application of electronic switching devices. With the operating conditions identified above, the induced electromagnetic stir pattern can be represented by exemplary flow lines 92a in FIG. 9(a), which is a double vortex ring, or toroidal vortex flow pattern with separate vortex rings in the lower and upper halves of the crucible.

Figure 9B:
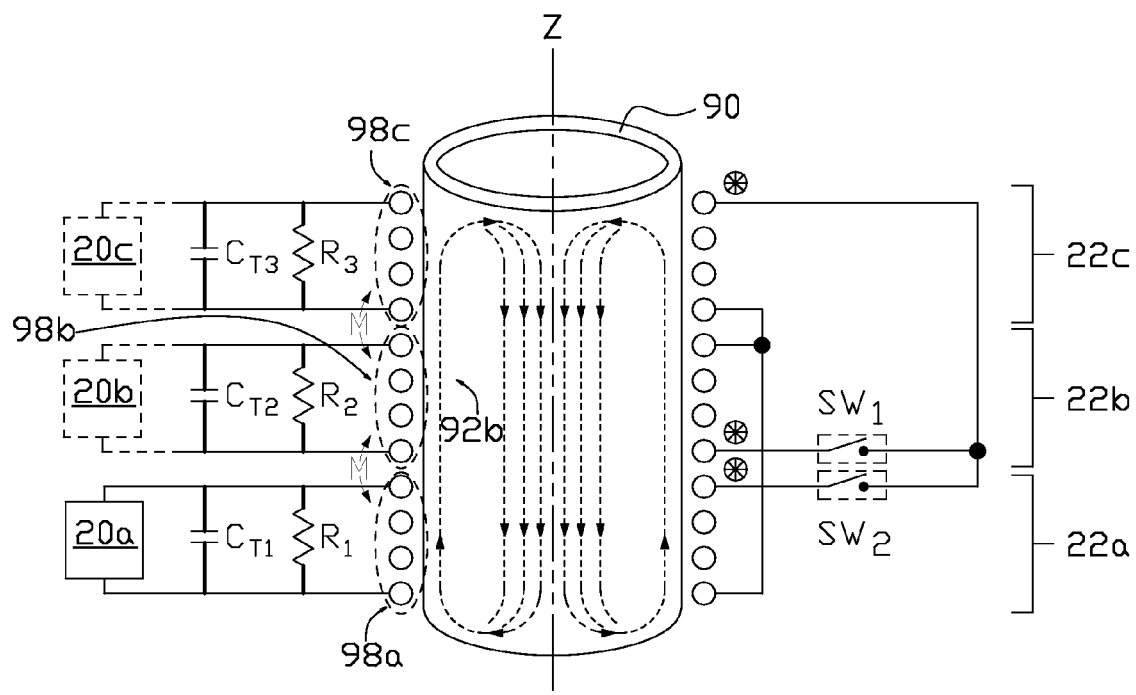
Figure 10A:
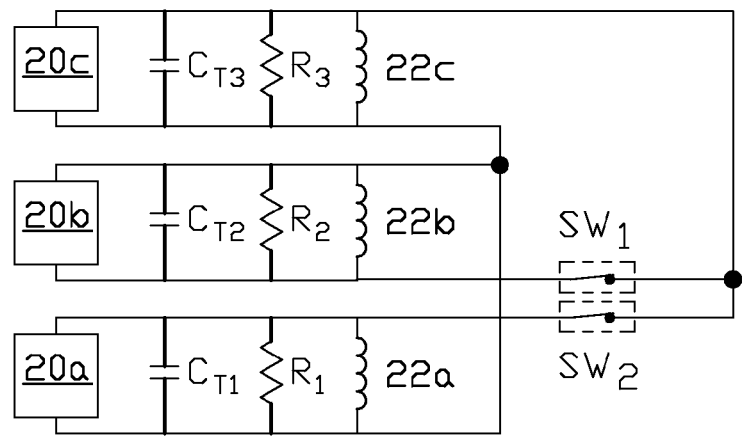
FIG. 10(a) and FIG. 10(b) are simplified schematic illustrations of an electric induction heating, melting and stirring arrangement using the power supply shown in FIG. 8.
Figure 12A:
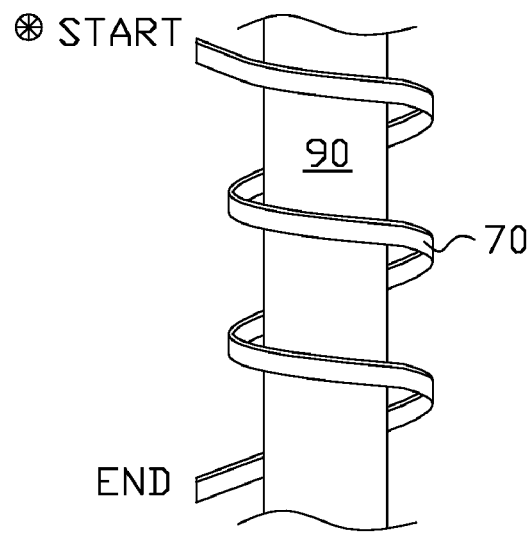
FIG. 12(a) and FIG. 12(b) respectively illustrate typical designating conventions for wound and counter-wound coil configurations.
Figure 12B:
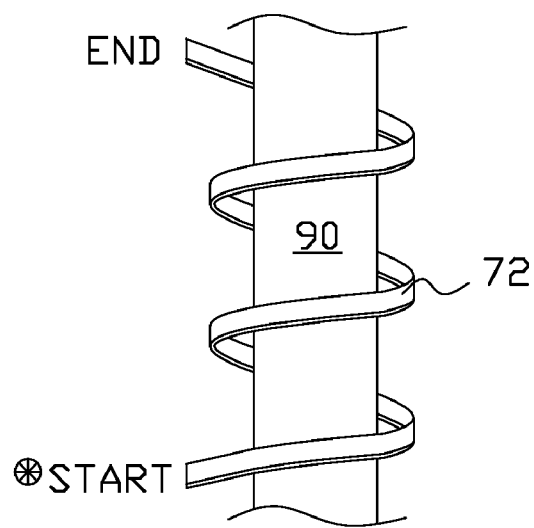

More generally each induction coil in FIG. 9(a) and FIG. 9(b) may be defined as having a first, or "start," end termination, and a second, or "end," end termination. For example in FIG. 12(a) if induction coil 70 represents a wound (right to left rise around crucible 90) oriented induction coil, and in FIG. 12(b) induction coil 72 represents a counter-wound (left to right rise around crucible 90) oriented induction coil, start and end terminals of each coil can be designated as shown in the figures. Alternatively as shown in FIG. 9(a) and FIG. 9(b), the start terminals of induction coils 22a, 22b and 22c can be designated with a "circled star" symbol as shown in the figures, indicating, for example, in this non-limiting example of the invention, that coil 22a and 22c are wound oriented and coil 22b is counter-wound oriented, or vice versa. Using this convention, the start terminals of all three induction coils are selectively connected together only when switches $SW_1$ and $SW_2$ are closed, while the end terminals of all three induction coils are always connected together in common. In other examples of the invention, more than three induction coils may be used, with the start terminals of all of the induction coils selectively connected together by one or more switching devices, and the end terminals of all of the induction coils always connected together in common, or vice versa.

Figure 10B:
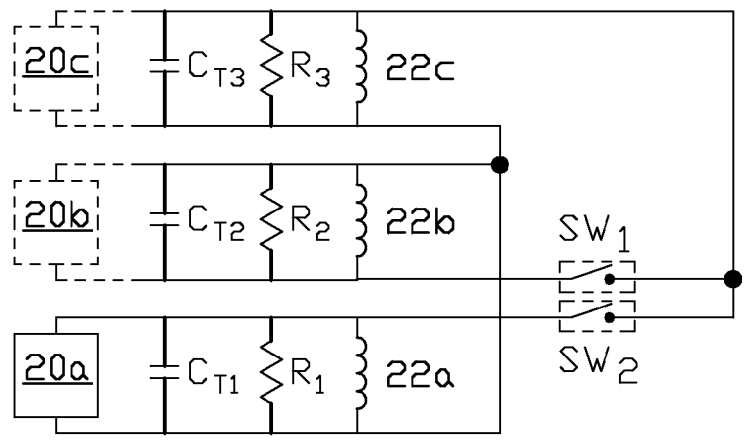
Figure 10C:
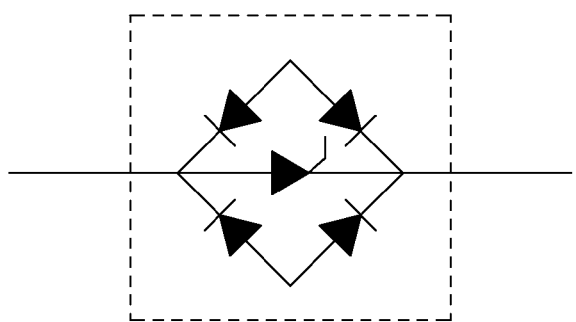
FIG. 10(c) is an illustration of one example of a diode bridge switch used in the arrangement shown in FIG. 9(a), FIG. 9(b) and schematics of FIG. 10(a) and FIG. 10(b).
Figure 11A:
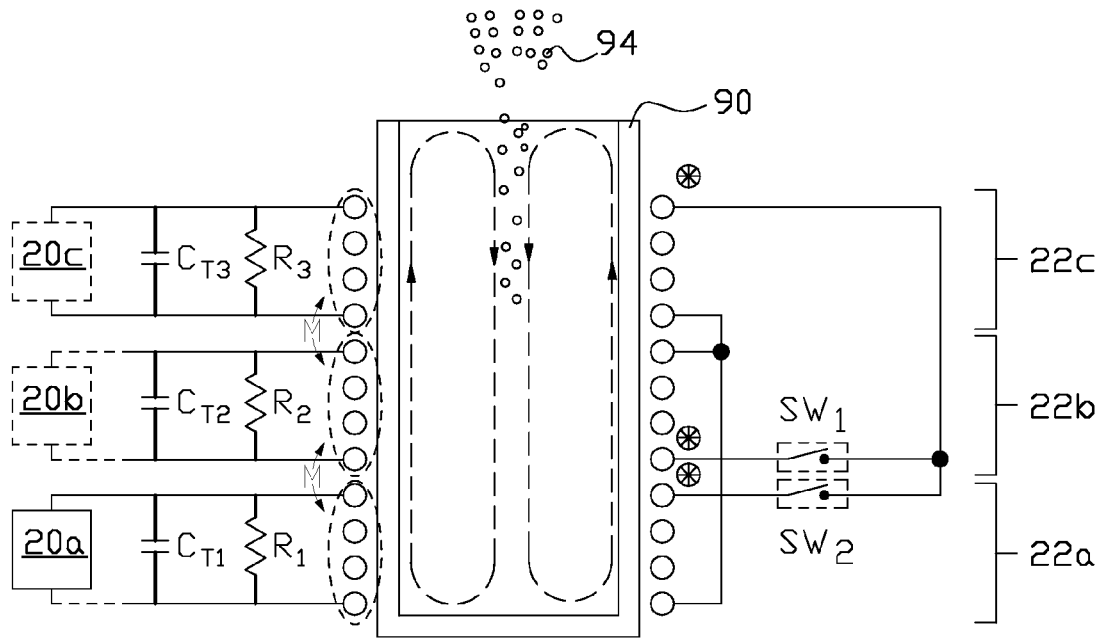
FIG. 11(a) is an illustration of one arrangement of the present invention for electric induction stirring.
Figure 11B:
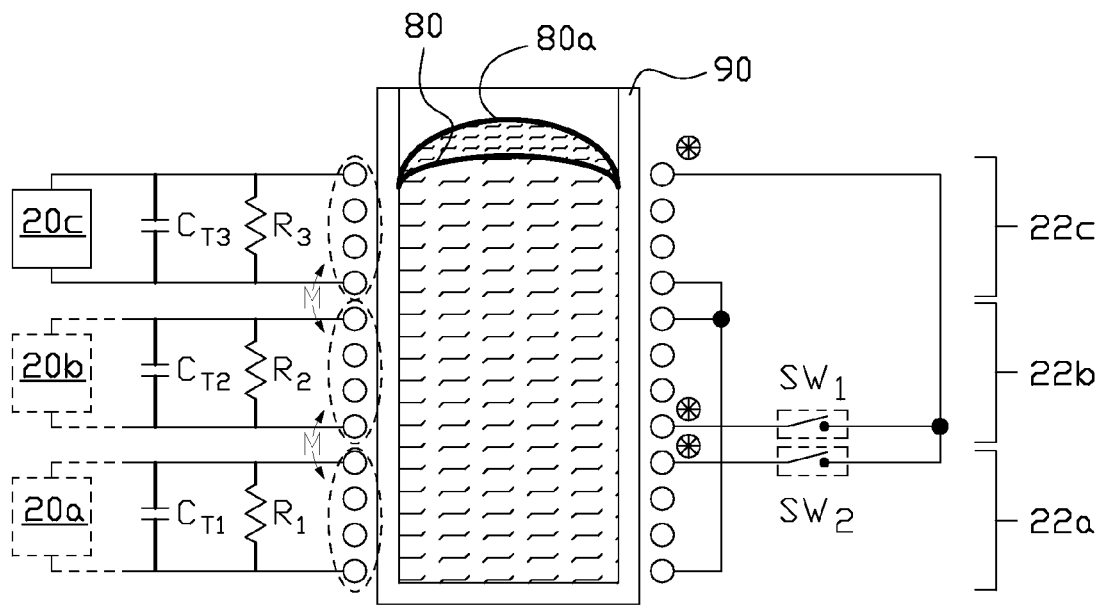
FIG. 11(b) is an illustration of one example of the present invention where the convex meniscus surface of molten metal material in the crucible is modulated.

In stir mode any two of the three power supplies may be set to quiescent state with the outputs from the two of the three power supplies being zero so that the tank capacitor, resistance and coil section associated with each quiescent state power supply forms a parallel RLC circuit. In stir mode both $SW_1$ and $SW_2$ are opened. In FIG. 9(b) and FIG. 10(b) power supply 20a is selected as active and power supplies 20b and 20c are in the off or quiescent state (illustrated by drawing these two power supplies in dashed lines). Consequently output current from power supply 20a flowing through coil 22a generates a magnetic field represented by typical flux line 98a. This magnetic field couples (diagrammatically represented by "M") with the RLC circuit formed by coil 22b, resistance $R_2$ and capacitor $C_{T2}$, which in turn, results in an induced current flow through coil 22b that generates a secondary magnetic field represented by typical flux line 98b. The secondary magnetic field couples with the RLC circuit formed by coil 22c, resistance $R_3$ and capacitor $C_{T3}$, which in turn, results in an induced current flow through coil 22c that generates a secondary magnetic field represented by typical flux line 98c. The combination of these magnetic fields will induce an electromagnetic flow pattern in molten electrically conductive material in the crucible as shown in FIG. 9(b). The induced electromagnetic stir pattern can be represented by exemplary flow lines 92b in FIG. 9(b) to create a single vortex ring flow pattern in the crucible with a downward flow pattern about the poloidal (circular) axis Z of the ring, or counterclockwise poloidal rotation. This stir arrangement is particularly useful when adding additional charge to the melt, such as metal chips 94, as illustrated in FIG. 11(a), so that the added charge is drawn quickly into the melt. The poloidal rotation may be reversed to clockwise by activating power supply 20c and deactivating power supplies 20a and 20b. In some examples of the invention, alternating or jogging the output power level of the upper power supply 20c can be used to agitate (modulate) the height of the convex meniscus 80 that defines the surface of the molten metal bath, for example, from meniscus 80 to 80a as shown in FIG. 11(b), to expose a greater molten metal surface area to the ambient atmosphere. This is of particular value when the application is a vacuum furnace and the ambient atmosphere is a vacuum. Increasing the molten metal surface area exposed to the vacuum above the surface, increases the efficiency of the outgassing.

The example of the invention shown in FIG. 9(a) and FIG. 9(b) may be used in both vacuum and non-vacuum induction furnace applications and either in a batch process, where the crucible is initially filled with solid and/or semisolid electrically conductive material, or a heel process, where electrically conductive solid or semisolid charge is gradually added to the existing heel at the bottom of the crucible. Typically the melt and heat mode (FIG. 9(a) and FIG. 10(a)) is used to initially melt all of the electrically conductive material in the crucible. Then the stir mode (FIG. 9(b) and FIG. 10(b)) is used, for example, to enhance conduction heating through the molten bath; and/or to promote degassing of the molten bath by circulating the molten bath volume so that the surface of the molten bath is continuously changing to promote gas transfer from the melt to the ambient atmosphere or vacuum; and/or to promote dissolving additional charge added to the molten bath by drawing it into the downward central vortex identified as axis Z in FIG. 9(b).

Although three induction coil sections are shown in the above examples of the invention, other quantities of coil sections may be used in other examples of the invention.

The above examples of the invention have been provided merely for the purpose of explanation and are in no way to be construed as limiting of the present invention. While the invention has been described with reference to various embodiments, the words used herein are words of description and illustration, rather than words of limitations. Although the invention has been described herein with reference to particular means, materials and embodiments, the invention is not intended to be limited to the particulars disclosed herein; rather, the invention extends to all functionally equivalent structures, methods and uses such as are within the scope of the appended claims. Those skilled in the art, having the benefit of the teachings of this specification, may effect numerous modifications thereto, and changes may be made without departing from the scope of the invention in its aspects.

The invention claimed is:

1. A power supply for an at least one RLC resonant load, the power supply comprising:
    an ac to dc rectifier having a rectifier input connected to an ac source and a rectifier dc output;
    at least one charge storage device connected to the rectifier dc output;
    at least one regulator, each of the at least one regulators having a regulator output with a regulator dc output period and a variable output duty cycle within the regulator dc output period, each of the at least one regulators connected to the at least one charge storage device;
    at least one current storage device, each of the at least one current storage devices exclusively connected to the regulator output of one of the at least one regulators; and
    at least one inverter, each of the at least one inverters having an inverter input exclusively connected to one of the at least one current storage devices, each of the at least one inverters having an inverter ac output exclusively connected to one of the at least one RLC resonant loads, the inverter ac output period of each one of the at least one inverters equal to twice the regulator output period of the at least one regulator connected to the at least one current storage devices connected to the inverter input of each one of the at least one inverters.

2. The power supply of claim 1 wherein the regulator output of at least one of the at least one regulators comprises a plurality of pulses in the variable output duty cycle.

3. The power supply of claim 1 wherein the ac to dc rectifier dc output has a variably controlled output voltage magnitude.

4. The power supply of claim 1 wherein the at least one regulator comprise a plurality of regulators, the at least one inverter comprises a plurality of inverters, the at least one RLC resonant load comprises a plurality of RLC resonant loads, each one of the plurality of RLC resonant loads exclusively connected to the inverter ac output of one of the plurality of inverters, each one of the plurality of regulators exclusively connected to at least one of the at least one current storage devices, and the inverter input of each one of the plurality of inverters exclusively connected to the at least one of the at least one current storage devices exclusively connected to one of the plurality of regulators.

5. The power supply of claim 1 wherein the at least one regulator comprise a pair of regulators, the at least one inverter comprises a pair of inverters, the at least one RLC resonant load comprises a pair of RLC resonant loads, each one of the pair of RLC resonant loads exclusively connected to the inverter ac output of one of the pair of inverters, each one of the pair of regulators exclusively connected to at least one of the at least one current storage devices, and the inverter input of each one of the pair of inverters exclusively connected to the at least one of the at least one current storage devices exclusively connected to one of the pair of regulators.

6. The power supply of claim 1 wherein the at least one regulator comprises a single regulator, the at least one inverter comprises a plurality of inverters, the at least one RLC resonant load comprises a plurality of RLC resonant loads, each one of the plurality of RLC resonant loads exclusively connected to the inverter ac output of one of the plurality of inverters, the single regulator connected to the at least one current storage device, and the inverter inputs of all of the plurality of inverters connected to the at least one current storage device.

7. The power supply of claim 1 wherein the at least one RLC resonant load comprises at least three RLC resonant loads, each of the at least three RLC resonant loads having an inductive element exclusively comprising at least one induction coil disposed around a crucible containing an electrically conductive material.

8. The power supply of claim 7, wherein each of the at least three RLC resonant loads are connected exclusively to the inverter ac output of one of the at least one inverters, the inverter input of each one of the at least one inverters connected exclusively to one of the at least one current storage devices, each one of the at least one current storage devices connected exclusively to the output of one of the at least one regulators, each one of the at least one regulators connected exclusively to a charge storage device connected exclusively to the rectifier dc output of the ac to dc rectifier.

9. The power supply of claim 8 wherein all of the at least three induction coils have their end terminals commonly connected together and their start terminals selectively connected together by at least one switching device to form a combined parallel RLC circuit from each of the at least three RLC resonant loads.

10. The power supply of claim 9 wherein one of the at least one inverters is in the quiescent state when the at least one switching device is opened.

11. A method of supplying power to an at least one RLC resonant load, the method comprising the steps of:
supplying dc power to a charge storage device;
regulating a supply of dc current from the charge storage device to a current storage device supplying dc current to an inverter having its ac inverter output connected to the at least one RLC resonant load;
operating the inverter at an inverter output frequency having an inverter period; and
varying the duty cycle of the supply of dc current from the charge storage device over a period equal to one half of the inverter period.

12. The method of claim 11 further comprising the step of generating a plurality of pulses during the duty cycle of the supply of dc current from the charge storage device.

13. The method of claim 12 wherein the plurality of pulses during the duty cycle is equal to the quantity of the maximum allowed power dissipation of a switch device used for regulating the supply of dc current from the charge storage device minus the conduction losses of the switch device divided by the switching losses with an equivalent single pulse during the duty cycle.

14. The method of claim 11 further comprising the step of varying the voltage magnitude of the dc power supplied to the charge storage device.

15. The method of claim 11 further comprising the step of surrounding the lower, middle and upper regions of a crucible containing an electromagnetically conductive material with an induction coil comprising an inductive element in each one of the at least one RLC resonant load.

16. The method of claim 11 further comprising the step of increasing the inverter output frequency of the inverter with unity duty cycle of the supply of dc current from the charge storage device.

17. The method of claim 15 further comprising the step of connecting each one of the induction coils to one or more switching elements to selectively switch each one of the at least one RLC resonant load between separate RLC resonant load circuits and RLC resonant load circuits connected in parallel.

18. The method of claim 17 further comprising the step of quiescing the inverter ac output associated with one of the at least one RLC resonant loads.

19. The method of claim 17 further comprising the step of quiescing the inverter ac output associated with the RLC resonant loads having the middle and lower induction coils as the inductive elements.

20. The method of claim 18 further comprising the step of varying the inverter output power magnitude associated with the RLC resonant load having the upper induction coil as the inductive elements.

* * * * *